United States Patent
Moscaritolo et al.

(10) Patent No.: US 6,854,339 B2
(45) Date of Patent: Feb. 15, 2005

(54) SINGLE-BODY DUAL-CHIP ORTHOGONAL SENSING TRANSIT-TIME FLOW DEVICE USING A PARABOLIC REFLECTING SURFACE

(75) Inventors: Daniel Moscaritolo, Thousand Oaks, CA (US); Francis H. Kantor, Newbury Park, CA (US); Fermin A. Sandoval Diaz, Camarillo, CA (US); David Tigwell, Houston, TX (US)

(73) Assignees: PTI Technologies, Inc., Oxnard, CA (US); D. C. Tigwell & Associates, Houston, TX (US)

(*) Notice: Subject to any disclaimer, the term of this patent is extended or adjusted under 35 U.S.C. 154(b) by 0 days.

(21) Appl. No.: 10/331,950

(22) Filed: Dec. 30, 2002

(65) Prior Publication Data

US 2004/0123673 A1 Jul. 1, 2004

(51) Int. Cl.⁷ .................................................. G01F 1/66
(52) U.S. Cl. ..................................................... 73/861.27
(58) Field of Search .......................... 73/861.28, 861.27

(56) References Cited

U.S. PATENT DOCUMENTS

| | | | |
|---|---|---|---|
| 4,754,650 A | * | 7/1988 | Smalling et al. ......... 73/861.28 |
| 5,090,252 A | * | 2/1992 | Tschirner ................. 73/861.28 |
| 5,372,047 A | | 12/1994 | Russwurm et al. |
| 5,437,194 A | | 8/1995 | Lynnworth |
| 5,644,090 A | | 7/1997 | Spendel |
| 5,650,572 A | | 7/1997 | Vontz |
| 6,178,827 B1 | | 1/2001 | Feller |
| 6,345,539 B1 | | 2/2002 | Rawes et al. |

* cited by examiner

Primary Examiner—Edward Lefkowitz
Assistant Examiner—Jewel Thompson
(74) Attorney, Agent, or Firm—Pillsbury Winthrop LLP

(57) ABSTRACT

An ultrasonic sensor having a pair of ultrasound transducers adapted to be inserted in and being able to perform at a single site of introduction into a duct. The ultrasonic sensor measures a forward ultrasonic path transit time and a second reverse ultrasonic path transit time of ultrasound signals propagating in a fluid. The arrangement being such that a comparison of the signal associated with ultrasound travel in one direction with that of the signal associated with ultrasound travel in the opposite direction enables the flow rate of the fluid in the duct to be determined. The ultrasonic sensor may utilize a curved reflecting surface on the duct and a reflective surface of an ultrasonic sensor end cap to provide forward and reverse ultrasonic W-shaped paths.

21 Claims, 7 Drawing Sheets

SINGLE-BODY DUAL-CHIP ORTHOGONAL SENSING TRANSIT-TIME FLOW DEVICE USING A PARABOLIC REFLECTING SURFACE

BACKGROUND

1. Technical Field

An embodiment of the present invention generally relates to an ultrasonic flow sensor. More particularly, an embodiment of the present invention relates to a transit-time ultrasonic flow sensor with a parabolic reflecting surface to measure a flow rate.

2. Discussion of the Related Art

The use of the insertion monitoring devices to measure fluid flow rate are restricted by cost and practical problems. For example, in one known insertion metering device, a probe is inserted into a duct through a hole or valve opening in the duct wall. The probe comprises a rod which carries a turbine or electromagnetic sensing element on its tip. The sensing element can take a point measurement indicative of the flow in a part of the duct at a point in time. However, because the flow in the duct is unknown, (varying both in profile across the cross-section of the duct and with time) several measurements must be taken at different points in the cross-section of the duct and at different times. An average can then be built up which would approximate the average flow rate. Its accuracy is limited by the difficulty in aligning the sensing element correctly along the axis of the duct.

In order to obtain reasonably accurate results, the prior art insertion technique requires that measurements be taken at several positions across at least one diameter of the duct. However, it has been found that in practice where flow profiles are distorted, it is necessary to measure across more than one diameter (i.e. two orthogonal diameters) to provide sufficiently accurate results which can be used for calibration. This introduces severe problems when the duct system is installed underground, as it requires that a large chamber must be excavated around the duct in order to allow access for separate circumferentially spaced holes in the duct to be made to allow the orthogonal measurements to be made. Additional problems may be encountered with duct systems installed in aircraft where access may also be difficult.

A further problem with the prior art technique is that the surface area of the rod which supports the sensing element forms a variable blockage in the duct as the element is moved across the diameter. This blockage affects the results by altering the flow profile in the duct and increases turbulence. Furthermore, the process of taking the many measurements required is subject to variability due to the often difficult operating conditions in which the measurements must be made. For example, the insertion probe operator may be working in a water filled, muddy pit which makes it difficult to obtain the various readings with any certain degree of accuracy.

Several different sensor configurations have also been used including: 1) direct measurement of a propagation time of a pulse emitted by a first transducer and received by a second transducer, where the change in time is a function of fluid flow rate; 2) dual "sing-around" sound velocimeters, where the difference in "sing-around" frequency between the velocimeters is a function of the fluid flow rate; 3) sensors producing continuous waves using two widely different high frequency carriers but commonly modulated with another much lower frequency signal, where the phase difference of the modulated signal on the received carriers is a function of the fluid flow rate; and 4) sensors producing bursts of continuous waves, using a single frequency on a pair of transducers, the burst duration being less than the acoustic propagation time between the transducers, where the time between the received transmissions is a function of flow rate.

Transit-time ultrasonic flow sensors, also known as "time-of-flight" ultrasonic flow sensors, detect the acoustic propagation time difference between upstream and downstream ultrasonic transmissions, resulting from movement of flowing fluid, and process this information to derive a fluid flow rate.

Transducers of transit-time ultrasonic flow sensors are most often field mounted. They are generally individually attached to the outside of a pipe. Unlike other types of ultrasonic flow sensors, such as Doppler ultrasonic flow sensors, transit-time ultrasonic flow sensors typically do not require placing a transducer inside a pipe in order to make a flow measurement. However, measurement accuracy may be compromised by a multitude of factors, such as pipe wall integrity, pipe surface condition, and distance between transducers.

Even when the transducers are in contact with the fluid being measured (wetted), the transducers may become misaligned, i.e., disposed at the wrong distance or angle, resulting in measurement error. Thus, sensors having wetted transducers are typically equipped with supporting electronics that include sophisticated diagnostics for confirming proper installation and operation. Consequently, such sensors are relatively expensive and have a reputation for occasionally producing erroneous measurements.

DETAILED DESCRIPTION

Reference in the specification to "one embodiment", "an embodiment", or "another embodiment" of the present invention means that a particular feature, structure or characteristic described in connection with the embodiment is included in at least one embodiment of the present invention. Thus, appearances of the phrase "in one embodiment" or "according to an embodiment" appearing in various places throughout the specification are not necessarily all referring to the same embodiment. Likewise, appearances of the phrase "in another embodiment" or "according to another embodiment" appearing in various places throughout the specification are not necessarily referring to different embodiments.

Figure 1:
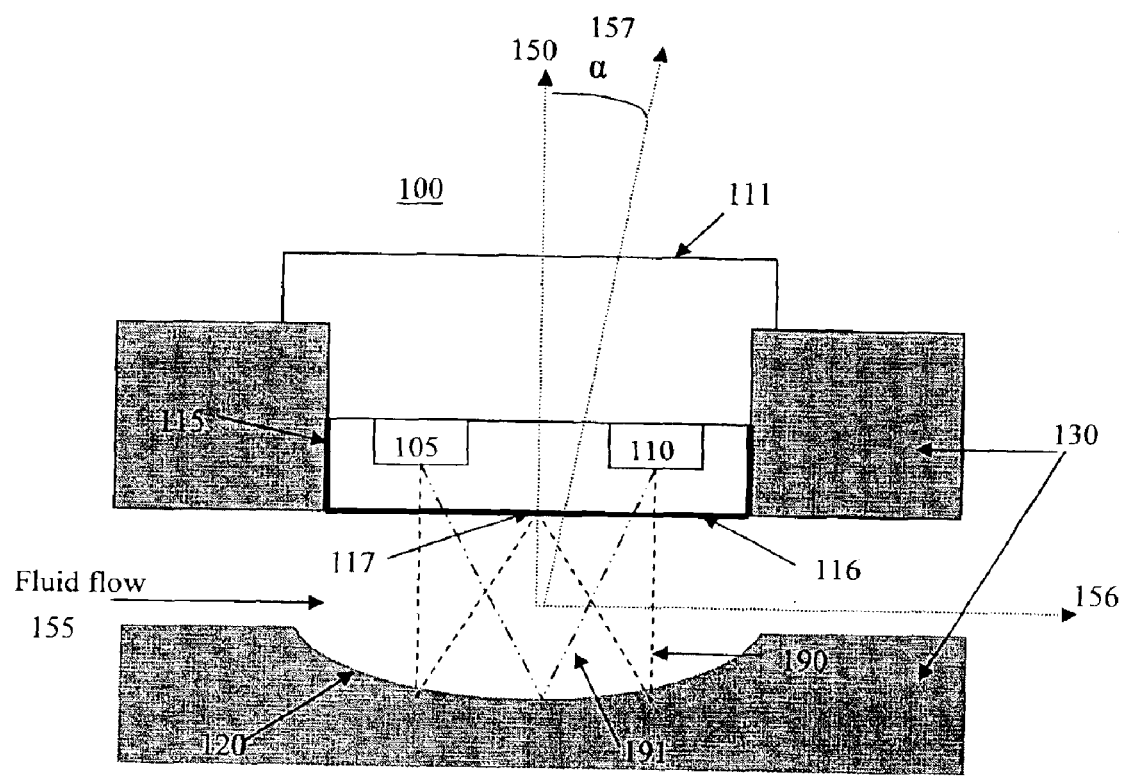
FIG. 1 illustrates an ultrasonic flow sensor and a curved reflecting surface according to an embodiment of the present invention.

Referring to FIG. 1, embodiments of the present invention are directed to an ultrasonic sensor 100 adapted to be inserted into a duct 130, the ultrasonic sensor 100 having ultrasound transducers 105, 110 and being able to perform at a single site of introduction into the duct 130. The flow sensor measures a forward ultrasonic path transit time having a component of travel of ultrasound in a forward direction relative to a fluid flow 155, i.e., an axial direction relative to the region of the duct 130 where the sensor 100 is inserted, and also being able to perform a second reverse path transit time measurement having a component of travel of ultrasound in a second axial direction opposite to the first axial direction, the arrangement being such that a comparison of the signal associated with ultrasound travel in one axial direction with that of the signal associated with ultrasound travel in the opposite axial direction enables the flow rate of fluid in the duct to be determined.

The ultrasonic sensor 100 requires at least one ultrasound transmitter and detector pair 105, 110 for each forward or reverse measurement. Embodiments of the present invention use the same transducer 105, 110 to transmit and detect. Therefore, two transducers 105, 110 each capable of transmitting and detecting may measure both the forward and the reverse transit times.

Embodiments of the present invention may use piezoelectric transducers to generate or receive the acoustic signals. Piezoelectric transducers, in the case of a receiver, convert force or mechanical stress into electric charge which in turn may be converted into a voltage. Conversely, if a voltage is applied to a piezoelectric transducer the resultant electric field will cause a deformation of the crystal material to generate an acoustic signal. The frequency range of the ultrasound signals may be up to 5 Mhz.

The first transducer 105 may comprise the transmitter of one forward path transmitter/receiver pair and the receiver of another reverse transmitter/receiver pair. The second transducer 110 may comprise the receiver of the forward transmitter/receiver pair and the transmitter of the reverse transmitter/receiver pair.

Figure 2:
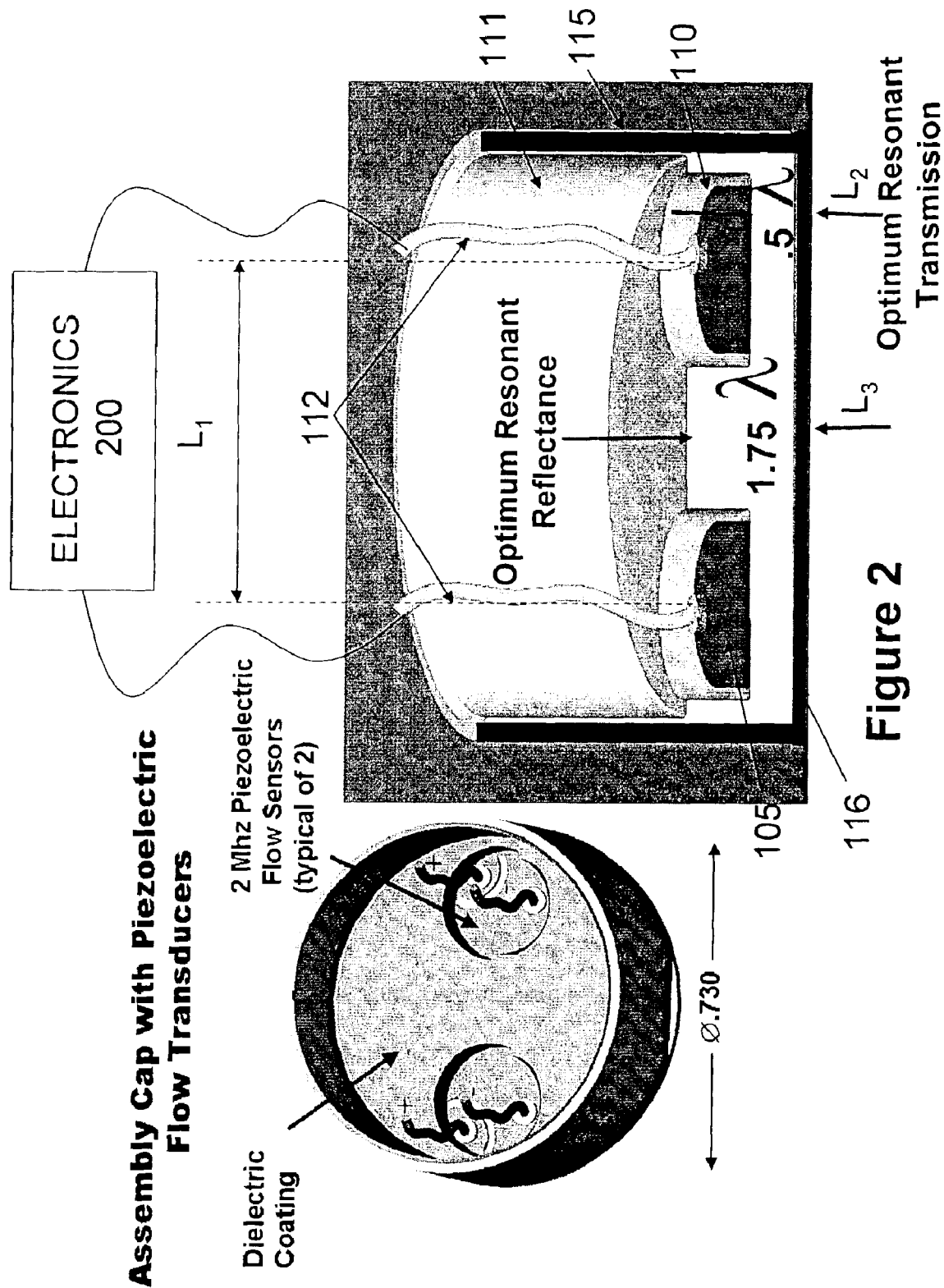
FIG. 2 illustrates an ultrasonic flow sensor including an end cap according to an embodiment of the present invention.

Referring to FIG. 2, the two transducers 105, 110 are mounted and spaced apart by a distance $L_1$ within a housing 111. An end cap 115 is hermetically sealed to the housing 111 to enclose and isolate the transducers 105, 110 from the flowing fluid 155. A distance $L_2$ between the end cap surface 116 in contact with the flowing fluid 155 and the emitting surface of the transducers 105, 110 is equal to $(n/2)\lambda$, where $\lambda$ is a wavelength of the transmitted signal, and n is an integer. For example, resonance transmission of an acoustic signal occurs for n=1 and $L_2=\frac{1}{2}\lambda$. A distance $L_3$ between the end cap surface 116 in contact with the flowing fluid 155 and a point on the housing 111 located between the transducers 105, 110 is equal to $(\frac{3}{4}+n/2)\lambda$, where $\lambda$ is a wavelength of the transmitted signal, and n is an integer. For example, resonance reflection of an acoustic signal occurs for n=2 and $L_3=1.75\ \lambda$.

Referring to FIG. 1, the ultrasonic sensor 100 is adapted to measure the transit times of an ultrasonic pulse in the forward and reverse directions of a W shaped path 190 or a V shaped path 191. The transit time difference in the forward and reverse directions of ultrasound travel along the W paths 190 or V paths 191 may be used to calculate the flow rate of fluid in the duct 130.

To calculate the flow rate from the transit times along each W shaped 190 or V shaped 191 transmission path, the difference between the transit times in the directions along the paths in the forward and reverse times may be used. An approximately proportional relationship exists between transit time and flow. For example, for a V shaped path:

$$V=K*D/\sin 2\Theta * 1/(T_o-\tau)^2 * \Delta T$$

Where:
V=mean velocity of flowing fluid
K=constant
D=inner diameter of pipe or duct
$\Theta$=incident angle of ultrasonic signal
$T_o$=Zero flow transit time
$\Delta T=T_2-T_1$
$T_1$=transit time of acoustic signal from upstream transducer to downstream transducer
$T_2$=transit time of acoustic signal from downstream transducer to upstream transducer
$\tau$=transit time of acoustic signal through pipe or duct wall and lining In addition to the above formula, the flowing fluid velocity ($V_f$) can be determined by the following equation:

$$V_f=Kdt/T_L$$

where K is a calibration factor for the volume and time units used, dt is the time differential between upstream and downstream transit times, and $T_L$ is the zero-flow transit time. Theoretically, transit-time ultrasonic meters can be very accurate (inaccuracy of ±0.1% of reading has been reported). The error in these measurements is limited by both the ability of the signal processing electronics to determine the transit time and by the degree to which the electrical signal used to generate the acoustic signal is constant i.e, a sonic velocity (C) that is constant. The speed of sound in the fluid is a function of the stability of the electrical signal used to generate the acoustic signal, the density of the fluid and the temperature of the fluid.

Therefore, relatively simple electronic circuitry may be employed to extract flow data. For example, an electronic transmitting and receiving device 200 may be used, connected to the transducers 105, 110 via wires 112 which pass through the housing 111 and may be sealed by epoxy. The electronics 200 may be connected after the flow sensor 100 is inserted (see FIG. 2).

Preferably the fluid flow sensor 100 i.e., the transducer pair 105, 110 contained within the end cap 115, are adapted to be flush with a wall of the duct 130 in use. This reduces the disturbance of the fluid flow to provide a higher accuracy measurement of the fluid flow rate (see also FIG. 3).

Because the ultrasound path has at least two path environments (forward and reverse W paths 190, or forward and reverse V paths 191) and because the ultrasound does travel through the fluid in the duct axially (at least with an axial component) rather than a single point measurement of flow being obtained as in the prior art, the fluid flow at several different points on the ultrasound path affects the signal that is measured. This provides a degree of built-in averaging or integration which eliminates the need to obtain many measurements at different points in the cross-section of the duct. Therefore, an amount of integration of the signal is inherently present, which provides a more accurate indication of flow rate than single point measurements. In addition, because there is no need to make measurements at different points, the sensor does not need to be moved which simplifies the operation. A longer acoustic path provides a more accurate indication of flow rate. Therefore, a W shaped path provides a more accurate indication of flow rate than does a V shaped path.

Referring to FIG. 1, preferably, the ultrasonic sensor 100 is adapted to use the reflection of the ultrasound off of a curved reflecting surface 120 on a wall of the duct 130 and a reflective surface 116 of the end cap 115 to create the forward W shaped ultrasonic path 190 and the reverse W shaped ultrasonic path 190. The ultrasonic paths are beams of ultrasound. The ultrasonic sensor 100 operates to take the forward and reverse ultrasonic path measurements from a stationary position. In addition, because there is no need to make measurements at different points, the sensor does not need to be moved which simplifies the operation.

In a prior art transit time flow sensor, the choice of length $L_1$ between the first transducer 105 and second transducer 110 is dependent upon the diameter of the duct and orientation angle $\alpha$ 157 of the transducers 105, 110. In use, signals are transmitted along paths between the transducers 105, 110, and in order for the first and second transducers 105, 110 to communicate when used in, for example, a circular duct 130, the relation $L_1=3 \tan \alpha\, D$ is preferable, where D is the duct diameter and $\alpha$ 157 is the angle of inclination of the acoustic paths relative to axis 150 orthogonal to the central axis 156 of the duct 130. This relationship arises because of the angle of reflection of the signal from the duct wall or walls.

As an example, given a duct diameter D=10 inches, if the angle of inclination $\alpha$ 157 is one degree, the signal path is one degree relative to axis 150 orthogonal to the central axis 156 of the duct 130, and the separation $L_1$ between the first transducer 105 and second transducer 110 is equal to approximately ½ inch. From the above, the length $L_1$ should be correctly set for different duct diameters and should be adjustable if the sensor assembly is to be suitable for use with any duct diameter.

FIG. 1 illustrates a flow sensor 100 utilizing a parabolic or spherical reflecting surface 120 according to an embodiment of the present invention. The parabolic or spherical reflecting surface 120 is located on the duct 130 wall opposite the transducers 105, 110. The transducers 105, 110 are oriented at an angle alpha 157 approximately equal to zero relative to the axis 150 orthogonal to the central axis 156 of the duct 130. Therefore, the initial path is in effect orthogonal to the duct axis 156. However, the pair of transducers 105, 110 need not be absolutely adjacent one another (i.e. $L_1 \neq 0$) because the acoustic signal diffracts (beam spreads) as it leaves the transducers 105, 110. In addition, the parabolic or spherical reflecting surface 120 serves to both redirect and focus the acoustic signal.

When the acoustic signals are reflected with a flat reflecting surface, the received signal is a summation of the transmitted signal having taken more than one path because of diffraction (beam spreading). The relative magnitudes and phase relationships of the components of the received signal may cause increased noise and drift in the flow rate output signal. This problem may be reduced by curving the reflecting surface 120 facing the transducers in the direction along the axis 156 between the transducers 105, 110 with a radius equal to approximately two times the distance between the midpoint between the transducers 105, 110 and reflecting surface 120. Because this degree of curvature is very small, it should not affect fluid flow sensing in most applications. The inside surface of a pipe would not provide the same benefit because its curvature is orthogonal to that desired.

In this embodiment, the first 105 and second 110 transducers launch acoustic signals at an angle alpha 157 approximately equal to zero, the acoustic signals impinge upon the parabolic or spherical reflecting surface 120. Specifically, the first transducer 105 launches a forward traveling acoustic signal at an angle alpha 157 approximately equal to zero into the duct which propagates through a forward traveling fluid 155 contained in the duct 130 until the acoustic signal reflects off of the parabolic or spherical reflecting surface 120. The acoustic signal is then re-directed back towards the flow sensor 100 until it makes a second reflection off of the end cap surface 116. This reflection takes place at a reflection point 117 located on the end cap 115 midway between the central axis of the first 105 transducer and the central axis of the second 110 transducer and occurs at an angle beta. The acoustic signal is then re-directed back towards the parabolic or spherical reflecting surface 120 to make a third reflection off of the parabolic or spherical reflecting surface 120. Again, the acoustic signal is then re-directed back towards the flow sensor 100 until it then passes through the end cap surface 116 to reach the second transducer 110 also oriented at an angle alpha 157 approximately equal to zero.

The reverse W path 190 is similar. The second transducer 110 launches a reverse traveling acoustic signal into the duct 130 which propagates through the forward traveling fluid 155 contained in the duct 130 until the acoustic signal reflects off of the parabolic or spherical reflecting surface 120. The acoustic signal is then re-directed back towards the flow sensor 100 until it makes a second reflection off of the end cap surface 116. This reflection takes place at the reflection point 117 located on the end cap 115 midway between the central axis of the first 105 transducer and the central axis of the second 110 transducer. The acoustic signal is then re-directed back towards the parabolic or spherical reflecting surface 120 to make a third reflection. Again, the acoustic signal is then re-directed back towards the flow sensor 100 until it then passes through the end cap surface 116 to reach the first transducer 105.

Figure 3:
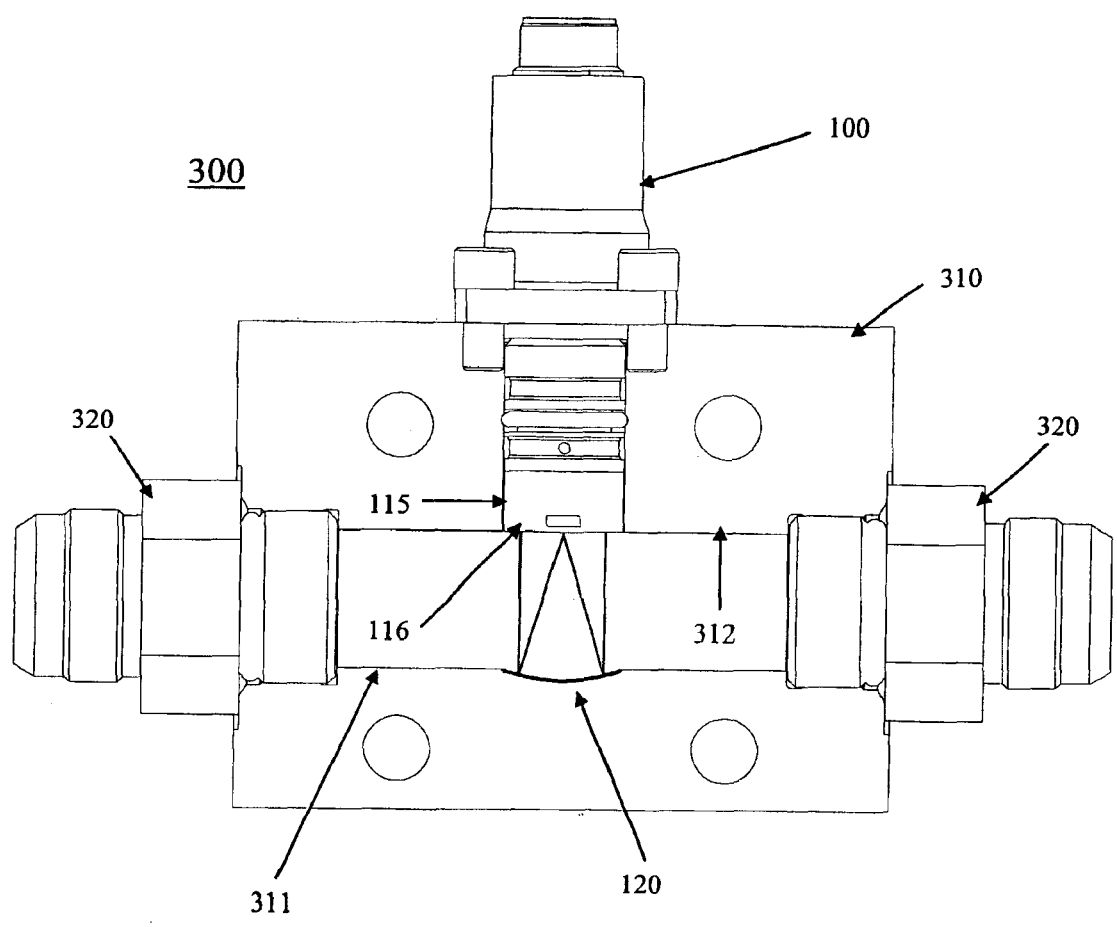
FIG. 3 illustrates an ultrasonic sensor system according to an embodiment of the present invention.

The curved reflecting surface 120 as shown in FIG. 1 and FIG. 3 may be machined or formed into an interior surface during the initial fabrication of e.g., a duct, a manifold, or a pipe. Alternatively, the curved reflecting surface 120 may be machined into an interior surface of e.g., an existing duct, manifold, or pipe in a "retrofit" process.

FIG. 3 illustrates an ultrasonic sensor system 300 consisting of a duct assembly 310, an ultrasonic sensor 100, a reflecting surface 120, and connectors 320. Ultrasonic sensor system 300 may be adaptable to an existing fluid system. Connectors 320 may be any type of mating connector that will provide a fluid tight seal, for example, with an existing fluid system. The reflective surface 116 of the end cap 115 is flush with an interior surface 312 of the duct assembly 310. This prevents any disturbance of a fluid flowing through the duct assembly 310. Curved reflecting surface 120 may be machined into an interior surface 311 of the duct assembly 310 during the fabrication of duct assembly 310.

Figure 4:
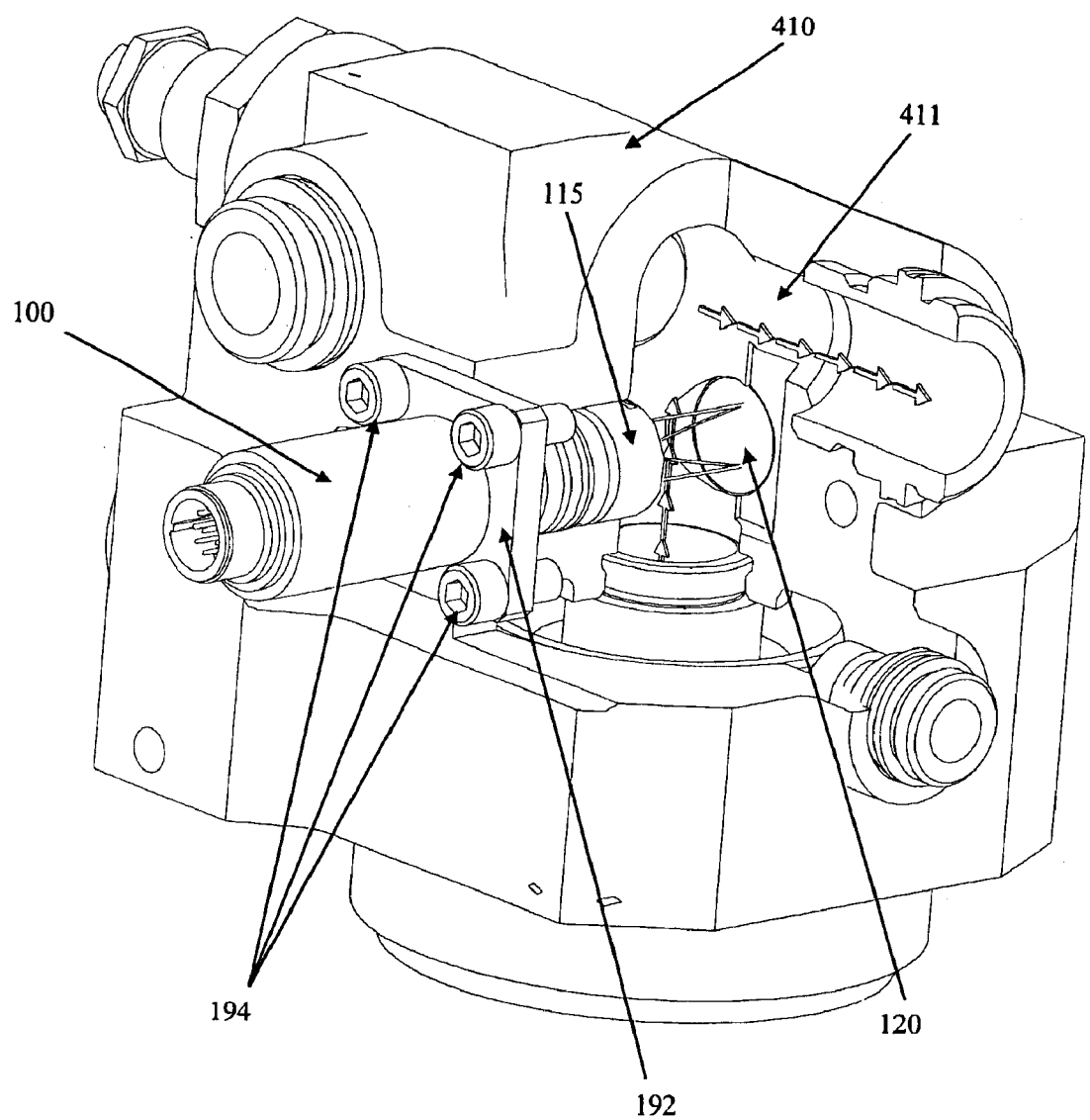
FIG. 4 illustrates an ultrasonic sensor installed into an existing duct assembly according to an embodiment of the present invention.
Figure 5:
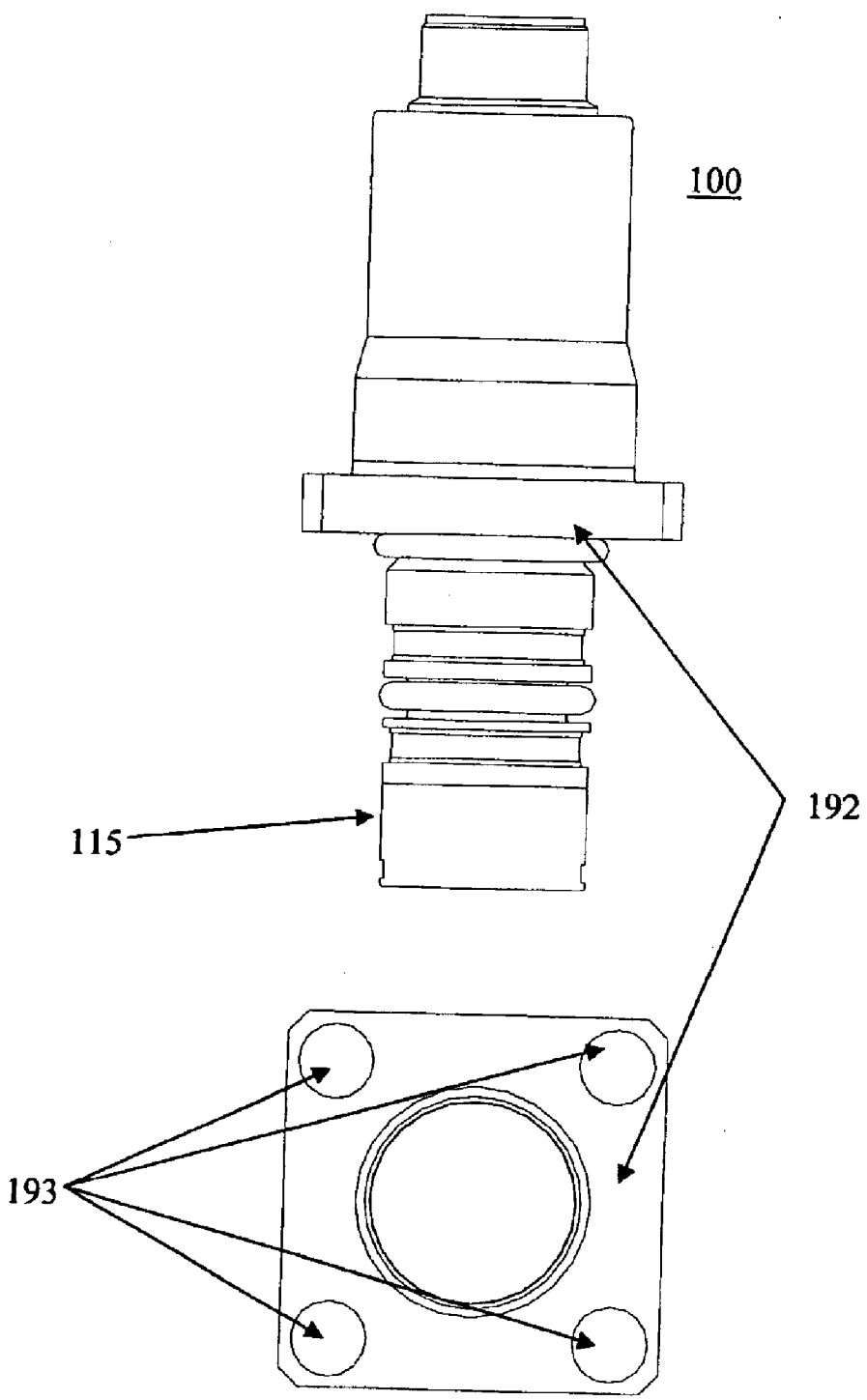
FIG. 5 illustrates an ultrasonic flow sensor including an end cap according to an embodiment of the present invention.

FIG. 4 illustrates an ultrasonic sensor 100 installed into an existing duct assembly 410. Curved reflecting surface 120 may be machined into an interior surface 411 of duct assembly 410 during a "retrofit" installation of ultrasonic sensor 100 into duct assembly 410. Referring to FIG. 4 and FIG. 5, ultrasonic sensor 100 may include a standardized mounting flange 192 including four mounting holes 193 to accommodate four mounting screws 194. The standardized mounting flange 192 replicates the mounting flange used on existing standardized fluid sensors. This aids in the retrofit process wherein an existing standardized fluid sensor may be removed and replaced by an ultrasonic sensor 100. The end cap 115 of ultrasonic sensor 100 fitting into the existing hole in the duct assembly 410 after removal of the existing standardized fluid sensor.

Figure 6:
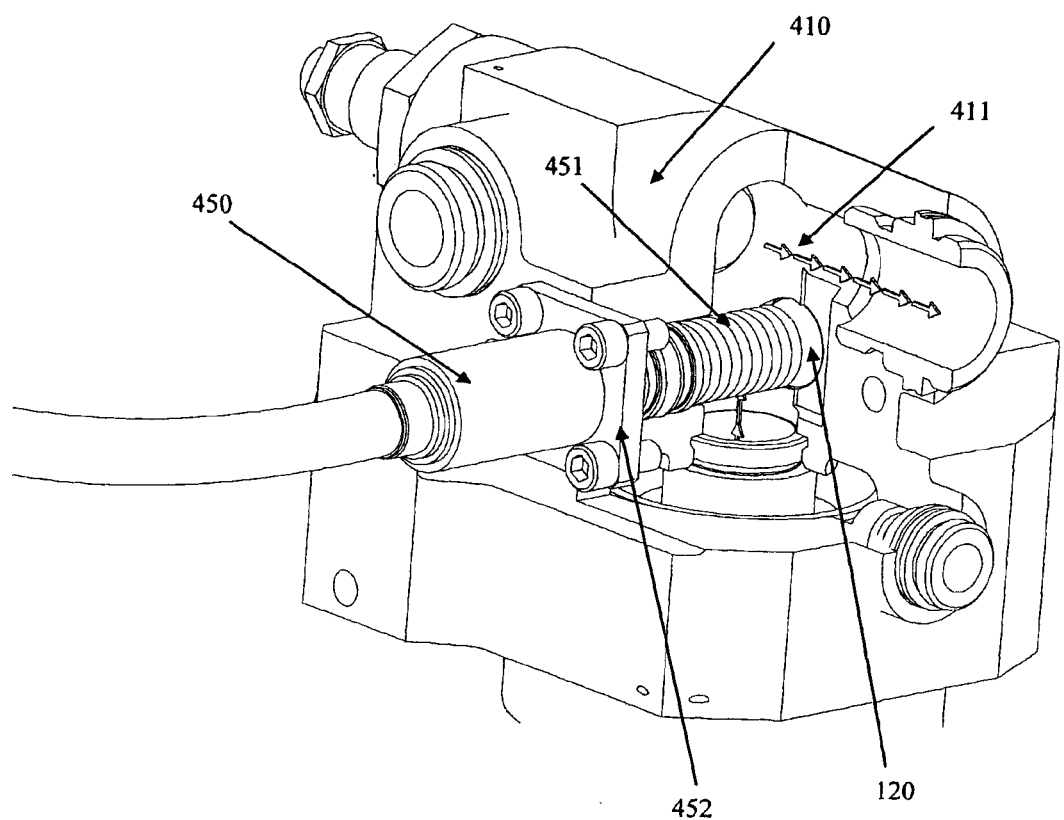
FIG. 6 illustrates a retrofit assembly including a boot structure with a mounting flange according to an embodiment of the present invention.

Referring to FIG. 6, the retrofit installation may require the machining of a reflecting surface 120 into an interior surface 411 of duct assembly 410. A retrofit assembly 450 that may include precision machining equipment and a boot structure 451 with a mounting flange 452 mounts to the existing hole pattern in the duct assembly 410. The boot structure 451 serves to contain the metal shards created during a machining process preventing contamination of the existing duct assembly 410 during the retrofit process. Accurate alignment of the retrofit assembly 450 may be achieved by using the mounting flange 452 in conjunction with the existing mounting holes in the duct assembly 410. A curved reflecting surface 120 may be machined into an interior surface 411 of duct assembly 410 using precision machining equipment that may be contained within the retrofit assembly 450.

Figure 7:
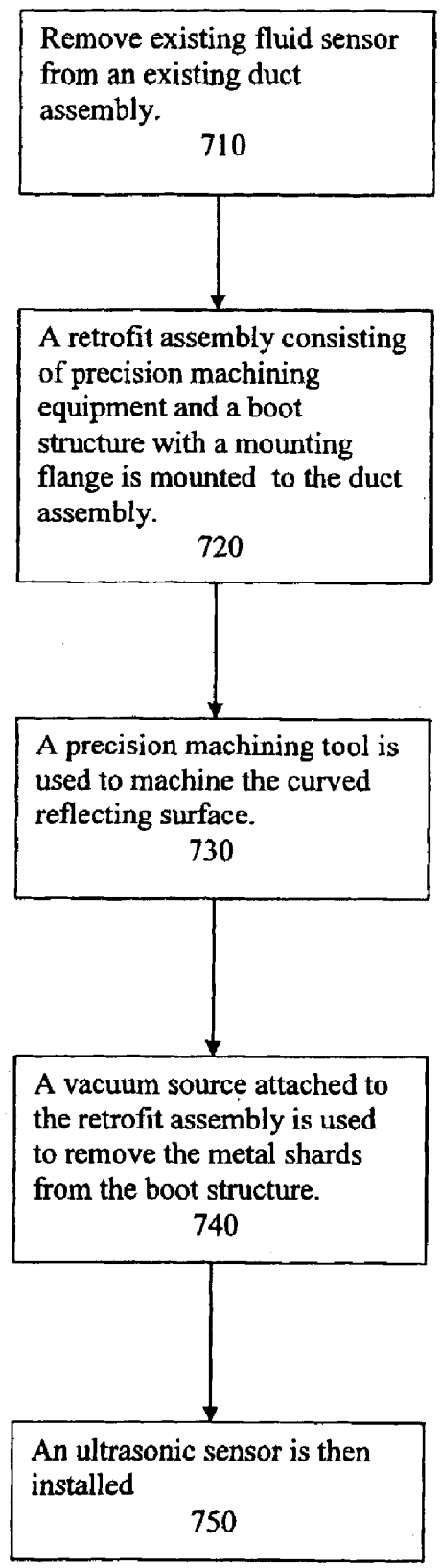
FIG. 7 illustrates a flow chart diagram for a method of installing an ultrasonic sensor into an existing duct assembly according to an embodiment of the present invention.

FIG. 7 illustrates a flow chart diagram for a method of installing an ultrasonic sensor into an existing duct assembly. An existing fluid sensor is first removed 710 from an existing duct assembly. A retrofit assembly 450 that may contain precision machining equipment and a boot structure 451 with a mounting flange 452 is mounted 720 to the existing hole pattern in the duct assembly 410 using four bolts through the four bolt mounting flange 452 into the existing four mounting holes. The precision machining equipment that may be contained within the retrofit assembly is inserted 730 through the existing hole in the duct assembly 410 to machine the curved reflecting surface 120. Any metal shards created during the machining process are contained within the boot structure 451. The precision machining equipment is withdrawn from the existing hole in the duct assembly 410 and a vacuum source that may also be contained within the retrofit assembly 450 is used to remove 740 the metal shards from the boot structure 551. An ultrasonic sensor 100 is then installed 750. The end cap 115 of ultrasonic sensor 100 fitting into the existing hole in the duct assembly 410. The standardized mounting flange 192 including four mounting holes 193 accommodates four mounting screws 194 secured to the duct assembly 410.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes that come within the meaning and range of equivalency of the claims are therefore intended to be embraced therein.

What is claimed is:

1. An ultrasonic flow detection apparatus, comprising:
   a first transducer to transmit a signal;
   a second transducer to receive the signal;
   at least one end cap enclosing and isolating the first transducer and the second transducer from a fluid, the end cap having a reflective surface located in contact with the fluid; and
   a curved reflecting surface to reflect the signal to the reflective surface.

2. The ultrasonic flow detection apparatus according to claim 1, wherein the signal transmitted by the first transducer reflects off of the reflective surface.

3. The ultrasonic flow detection apparatus according to claim 2, wherein the signal transmitted by the first transducer reflects off of the reflective surface of the end cap back to the curved reflecting surface.

4. The ultrasonic flow detection apparatus according to claim 1, wherein the signal transmitted by the first transducer approximately traverses a W shaped path that extends from the first transducer to the curved reflecting surface to the reflective surface to the curved reflecting surface to the second transducer.

5. The ultrasonic flow detection apparatus according to claim 1, wherein a distance between the reflective surface and a point on an inner end cap surface located between the first transducer and the second transducer is approximately equal to $(\frac{3}{4}+n/2)\lambda$, where $\lambda$ is a wavelength of the transmitted signal, and n is an integer.

6. The ultrasonic flow detection apparatus according to claim 1, wherein a distance between a first transducer surface or a second transducer surface and an end cap surface is approximately equal to $(n/2)\lambda$, where $\lambda$ is a wavelength of the transmitted signal, and n is an integer.

7. The ultrasonic flow detection apparatus according to claim 1, wherein the signal travels generally in the direction of a fluid flow and the signal is used to measure a rate of the fluid flow.

8. The ultrasonic flow detection apparatus according to claim 1, wherein the signal travels generally in a direction opposite the direction of a fluid flow and the signal is used to measure a rate of the fluid flow.

9. An ultrasonic sensor system, comprising:
   a duct for providing a flow path for a fluid in a flow direction;
   an ultrasonic flow sensor sealingly coupled to the duct, including:
   a first transducer to transmit a signal,
   a second transducer to receive the signal,
   at least one end cap to enclose and isolate the first transducer and the second transducer from the fluid; and
   a curved reflecting surface to reflect the signal toward a reflective surface located on the end cap, wherein the reflective surface lies along an axis approximately half-way between the first transducer and the second transducer, a path of the signal extends generally along a longitudinal axis of the duct parallel to the flow direction, the path extends from the first transducer to the curved reflecting surface to the reflective surface to the curved reflecting surface to the second transducer.

10. The ultrasonic sensor system according to claim 9, wherein the curved reflecting surface is located on a duct wall.

11. The ultrasonic sensor system according to claim 9, wherein the signal travels generally in the direction of the fluid path and the signal is used to measure a rate of fluid flow.

12. The ultrasonic sensor system according to claim 9, wherein the signal travels generally in a direction opposite the direction of the fluid path and the signal is used to measure a rate of fluid flow.

13. The ultrasonic sensor system according to claim 9, wherein a distance between the reflective surface and a point on an inner end cap surface located between the first transducer and the second transducer is approximately equal to $(\frac{3}{4}+n/2)\lambda$, where $\lambda$ is a wavelength of the signal, and n is an integer.

14. The ultrasonic sensor system according to claim 9, wherein a distance between a first transducer surface or a second transducer surface and an end cap surface is approximately equal to $(n/2)\lambda$, where $\lambda$ is a wavelength of the signal, and n is an integer.

15. A method of determining a flow rate of a fluid in a duct, comprising:

transmitting a signal from a first transducer through an end cap and a fluid, wherein a path of the signal extends generally along a longitudinal axis of the duct parallel to a direction of fluid flow, and the end cap encloses the first transducer and a second transducer and acts as a barrier to the fluid;

reflecting the signal from a curved reflecting surface;

receiving the signal at the second transducer;

measuring a first time between transmitting the signal in a forward direction and receiving the signal;

measuring a second time between transmitting the signal from the second transducer in a reverse direction and receiving the signal at the first transducer; and comparing the first time to the second time to determine the flow rate of the fluid.

16. The method according to claim 15, wherein the curved reflecting surface is located on a wall of the duct.

17. The method according to claim 15, wherein the path of the signal extends from the first transducer to the curved reflecting surface to a reflective surface to the curved reflecting surface to the second transducer, and the reflective surface lies along an axis approximately half-way between the first transducer and the second transducer.

18. The method according to claim 17, wherein a distance between the reflective surface and a point on an inner end cap surface located between the first transducer and the second transducer is approximately equal to $(\frac{3}{4}+n/2)\lambda$, where $\lambda$ is a wavelength of the signal, and n is an integer.

19. The method according to claim 18, wherein a distance between the first transducer or the second transducer and an end cap surface is approximately equal to $(n/2)\lambda$, where $\lambda$ is a wavelength of the signal, and n is an integer.

20. The method according to claim 15, wherein the signal travels generally in the direction of the fluid flow and the signal is to used measure a rate of the fluid flow.

21. The method according to claim 15, wherein the signal travels generally in a direction opposite the direction of the fluid flow and the signal is used to measure a rate of the fluid flow.

* * * * *